June 11, 1946. M. SPINELLO Re. 22,766

DOOR LOCK

Original Filed April 6, 1942

Inventor:
Matthew Spinello
By
McCanna, Wintercorn & Morsbach
Attys.

Reissued June 11, 1946

Re. 22,766

UNITED STATES PATENT OFFICE 22,766

DOOR LOCK

Matthew Spinello, Rockford, Ill.

Original No. 2,343,249, dated March 7, 1944, Serial No. 437,774, April 6, 1942. Application for reissue March 5, 1945, Serial No. 581,194

25 Claims. (Cl. 70—462)

This invention relates to door locks and more particularly bore type locks, which are so-called because the transverse holes in the door made to receive the lock can be bored with an auger bit and there is very little mortising necessary.

One of the principal objects of my invention is to provide a lock of the kind mentioned which is quickly and easily convertible to suit right or left hand use and to change from a spring latch to a dead bolt, to suit requirements.

A salient feature of the lock of my invention consists in the provision of a detachable bracket carrying the operating finger arranged to be applied to the inner end of the bolt housing on either side, depending upon what side of the door is the outer side onto which the barrel of the lock is to be applied, the bolt housing itself being rotatable about its longitudinal axis, and the aforesaid bracket being applicable thereto from the top or bottom, whereby to adapt the lock to a right or left hand door.

Another important object of my invention is to provide a lock in which the bolt has a cam plate attached thereto with a pin and slot connection and operable by the aforesaid operating finger to move the bolt in either direction, the bolt housing carrying a spring pressed catch, which engages in notches in the bolt to hold it positively in either extreme position, the catch being arranged to be cammed out of the way by the aforesaid plate upon movement of the operating finger, thus providing a lock in which the bolt is tamper-proof, being securely held extended or retracted, although movable with the operating finger very smoothly and easily in either direction. Removal of the spring pressed catch and insertion of a spring to hold the bolt normally extended are the only things which it is necessary to do to convert the dead bolt to a spring latch.

The invention is illustrated in the accompanying drawing, in which—

Figure 2:
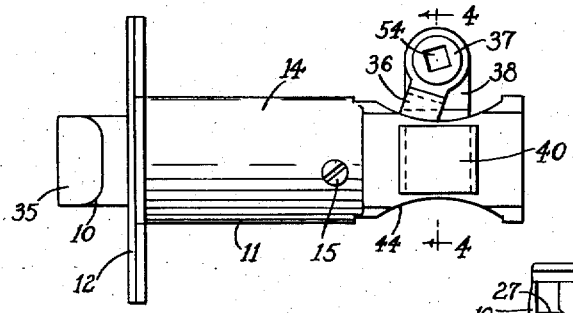
Fig. 2 is a side view of the bolt housing removed from the door and showing the bracket and operating finger assembly mounted thereon.
Figure 3A:
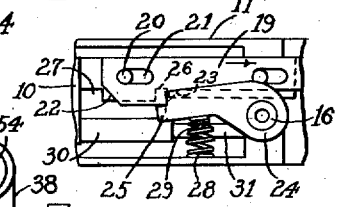
Fig. 3 is an inside view of the bolt housing, the removable housing side plate having been removed.
Figure 3:
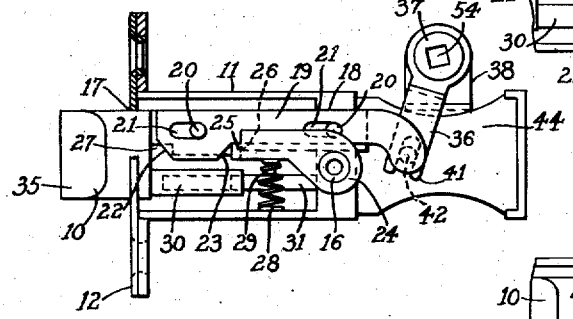
Figure 3B:
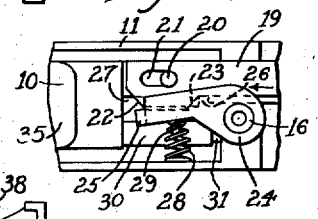
Figure 5:
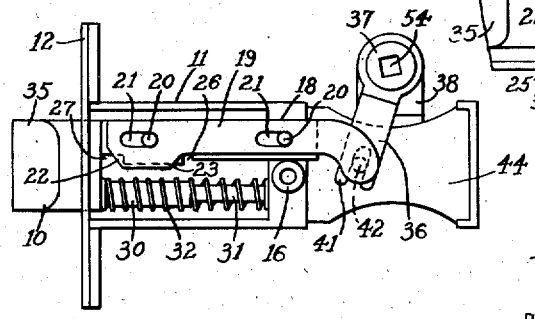
Figure 4:
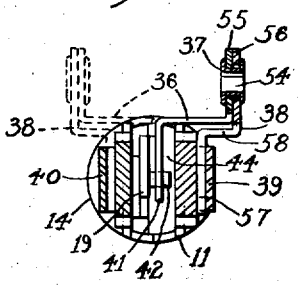

Figs. 3*a* and 3*b* correspond to a portion of Fig. 3, but show the parts in moved positions to illustrate the camming out of the way of the catch in the movement of the bolt in both directions;

Fig. 4 is a cross-section on the line 4—4 of Fig. 2, indicating in dotted lines one of three other possible positions of assembling the detachable bracket and operating finger assembly, and Fig. 5 is a view similar to Fig. 3 with the catch removed and a spring inserted to convert the dead bolt of Fig. 3 to a spring latch.

The same reference numerals are applied to corresponding parts throughout the views.

Figure 1:
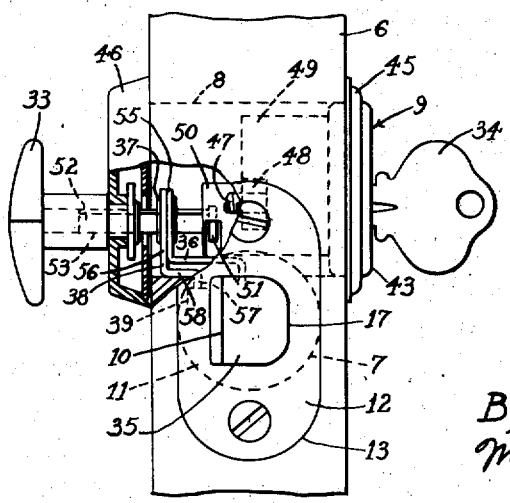
Figure 1 is a view looking at the free edge of a door equipped with a lock made in accordance with my invention, a portion of the door and lock being shown in section to better illustrate the invention.

Referring to Fig. 1, the reference numeral 6 designates a door in which the transverse holes 7 and 8 are bored with auger bits to receive the lock of my invention, designated generally by the reference numeral 9. 10 is the bolt reciprocable in the generally cylindrical housing 11 received in the hole 7 and fastened in place in the usual way by the escutcheon plate 12 in a recess 13 mortised in the edge of the door. A side plate 14 forming substantially half of the housing 11 is removably secured in place by a screw 15 threading in a hole in the neck 16 provided inside the housing. The bolt 10 is guided for reciprocation in the housing 11 in the bearings 17 and 18 and has a lost motion connection with an elongated cam plate 19 by means of pin projections 20 on the bolt slidable in slots 21 in the plate. There are two cam surfaces 22 and 23 on the lower edge of the plate 19 in longitudinally spaced relation. These cam surfaces are for actuating a catch 24 that is pivoted on the neck 16 and has a lug 25 projecting laterally from the free end thereof for engagement in either one of two longitudinally spaced notches 26 and 27 provided in the bottom of the bolt 10. A coiled compression spring 28 seated at one end in the housing and having its other end fitted over a lug 29 projecting downwardly from the catch 24 serves to urge the catch normally into engagement with the bolt.

In operation, the bolt 10 can be moved in either direction by means of the cam plate 19. In retracting the bolt from the extended position shown in Fig. 3, the cam surface 23 in the initial movement of the plate 19 releases the catch 24, as shown in Fig. 3*a*, and then the bolt is, of course, free to move inwardly relative to the housing 11. At the end of the inward movement, the lug 25 on the catch 24 engages in the notch 27, thus locking the bolt positively in retracted position. Thereafter when the bolt is to be extended, the initial outward movement of the cam plate 19 causes release of the catch 24 by cooperation of the cam surface 22 with the lug 25 in the manner shown in Fig. 3*b*. After release of the catch 24, the bolt 10 is of course free to move with the plate 19, similarly as in retracting the bolt. The operation is smooth and easy both ways, and it should be clear that the catch locks the bolt positively in either extreme position and the bolt is therefore tamper-proof.

The bolt 10 has a tubular guide portion 30 extending inwardly therefrom and having a free telescoping fit on a pin 31 mounted in the housing 11 and extending longitudinally thereof. When it is desired to convert the "dead bolt" shown in Fig. 3 to a spring latch, as shown in Fig. 5, the only changes necessary are the removal of the catch 24 with its spring 28 and the provision of a long coiled compression spring 32 in the housing 11 acting between the housing and bolt, as shown in Fig. 5. The guide 30 forms a convenient mounting for the spring 32. In operation, this spring latch permits slamming the door with the bolt projecting, but, of course, it requires the operation of the inside knob 33, or the key 34 on the outside of the door, as will soon appear, to retract the bolt so that the door can be opened.

The bolt housing 11 fits freely in the hole 7 bored in the door 6 and is adapted to be turned through 180° to have the beveled face 35 on the outer end of the bolt 10 face one way for right hand operation, as it appears in Fig. 1, and in the opposite direction for left hand operation. The operating finger 36 is pivotally mounted by means of a bushing 37 on a bracket 38 arranged to be detachably mounted on the bolt housing 11 in either one of two bearings 39 and 40 provided on opposite sides thereof. The bearing 40 is formed as a part of the side plate 14. The bracket 38 can be mounted in either of these bearings from either end, thereby enabling the assembling of the operating finger 36 with its forked end 41 straddling the cross-pin 42 on the inner end of the cam plate 19 in either one of four positions to suit either a right or left hand door, and in either of those instances the placing of the cylinder lock 43 on the inner or outer side of the door. The inner end of the housing 11 has a diametrically extending opening 44 to permit entry of the finger 36 from either side for connection of the fork 41 with the pin 42. The bracket 38 will, of course, be assembled on the housing 11 after the latter has been entered in the hole 7. That can be done easily through the larger transverse hole 8, as should be apparent from inspection of Fig. 1, the housing 11 having its inner end projecting into the hole 8 to the extent indicated for easy entry of the operating finger 36 down into the opening 44 to connect with the pin 42 at the same time that the bracket 38 is entered in the bearing 39 or 40 as the case may be. It is manifest, therefore, that to install this lock the carpenter can quickly and easily adapt it to the specific requirements of the job in hand, because the lock is universally adaptable. There is no need for the supply house to keep right and left handed locks in stock. Consequently there is a saving in cost and the likelihood of confusion and delays is avoided.

The cylinder lock, indicated at 43, is of conventional design and construction and is adapted to be entered in one end of the hole 8 after an escutcheon ring 45 has been pressed or driven into that end of the hole. The lock is secured in place from the opposite side of the door by an escutcheon plate 46 through which two screws, one of which is indicated at 47 in Fig. 1, are extended and threaded in ears 48 on the inner end of the body 49 of the lock 43. The cylinder 50 of the lock, which turns with the key 34, has a loose lost motion connection at 51 with a stub shaft 52 of square cross-section. The knob 33 has a square bore 53 in its shank portion snugly receiving the other end of the shaft 52 and, as clearly appears in Fig. 1, the shank portion of the knob 33 is rotatably mounted in the escutcheon plate 46. Now, the shaft 52 is connected intermediate its ends with the operating finger 36 by entry through the square hole 54 in the bushing 37, whereby to oscillate the operating finger in the turning of the shaft by means of the knob 33 or key 34. The lost motion at 51 permits 90° turning of the shaft 52 independently of the cylinder 50 as required in unlocking the door from the inner side. There is sufficient play also at the connection 51 so that the knob 33 does not have to be exactly aligned with the cylinder 50 and the axis of the cylinder may be at a slight angle to the axis of the knob. In that way the lock will operate smoothly and easily and there will be no tendency to bind, even if there is a certain amount of misalignment. The fact that the operating finger 36 has its operated end 55 in offset parallel relation to the forked end 41 to the extent shown in Figs. 1 and 4, the supporting bracket 38 having its outer end 56 likewise offset from its supported end 57, enables the close coupled relationship illustrated between the lock 43 and bolt housing 11, and in that way the lock 43 can be placed substantially flush with the outside of the door, leaving little or nothing exposed on which a burglar can work in attempting to break in. In many other locks with which I am familiar, the escutcheon plate on the outside of the door had to be of an embossed design approximately to the extent of the offset of the portion 55 with respect to the portion 41 of the operating finger 36. Such an embossed escutcheon plate invites tampering. The offset in the bracket 38 is incidentally of advantage in providing the intermediate bearing portion 58, which, as indicated in Fig. 1, is adapted to rest on the lower side of the hole 8 to help support the bracket and tend to eliminate side thrust on the shaft 52 by reason of the more definite location of the bushing 37 in relation to the hole 8 into which the lock 43 is entered.

It is believed the foregoing description conveys a good understanding of the objects and advantages of my invention. The appended claims have been drawn to cover all legitimate modifications and adaptations.

I claim:

1. In a device of the character described, the combination of a casing, a bolt supported in the casing for endwise movement, a spring actuated catch pivoted in the casing and arranged to have locking engagement with the bolt under spring pressure in different positions of endwise movement of the bolt, a cam plate having a lost motion connection with the bolt and adapted to move the same endwise in either direction, said cam plate having cam surfaces provided thereon arranged to have sliding engagement with the catch to release the same in the free movement of the cam plate relative to the bolt, and manually operable means connected with the cam plate for moving the bolt endwise through the medium of the cam plate.

2. In a device of the character described, the combination of a casing insertible in a hole bored into the edge portion of a door from the edge thereof, a bolt movable endwise in said casing having means projecting from the inner end thereof for communicating endwise movement to the bolt, said means including a crosspin, an operating finger having a slotted end adapted to be detachably engaged on the crosspin, a bracket for pivotally supporting said finger having means for detachably mounting the same on the inner end of said casing, the bracket and finger being adapted to be assembled in relation to the casing and bolt in the manner stated through another hole bored in the edge portion of the door in transverse intersecting relation to the inner end of the first mentioned hole, an outside key-operated lock insertible in the last mentioned hole and including a rotatable cylinder and shaft rotatable therewith detachably connectable with the operating finger to operate the bolt with a key, said shaft having a lost motion operating connection with the cylinder to permit turning of the shaft independently of the cylinder through a predetermined angularity, and an inside manually operable knob detachably connectible with said shaft for movement of the bolt in either direction independently of the lock.

3. A device as set forth in claim 2, wherein the operating finger has that portion thereof which is pivoted on the bracket laterally offset in relation to the slotted portion that is connected with the crosspin, the offsetting being in a direction away from the key-operated lock, substantially as and for the purpose described.

4. A device as set forth in claim 2, wherein the operating finger has that portion thereof which is pivoted on the bracket laterally offset in relation to the slotted portion that is connected with the crosspin, the offsetting being in a direction away from the key-operated lock, substantially as and for the purpose described, and wherein the bracket pivotally supporting said finger has its finger supporting end portion laterally offset in relation to the other end portion of the bracket in the same direction, substantially as and for the purpose described.

5. A device as set forth in claim 2, wherein the operating finger has that portion thereof which is pivoted on the bracket laterally offset in relation to the slotted portion that is connected with the crosspin, the offset being in a direction away from the key-operated lock, substantially as and for the purpose described, and wherein the bracket pivotally supporting said finger has its finger supporting end portion laterally offset in relation to the other end portion of the bracket in the same direction, substantially as and for the purpose described, the intermediate portion of the bracket connecting the relatively offset end portions providing a bearing surface adapted to engage the bottom of the hole bored in the door to support and locate the bracket and finger with respect to the key-operated lock and manually operated knob.

6. In a device of the character described, the combination of a casing insertible in a hole bored into the edge portion of a door from the edge thereof, a bolt movable endwise in said casing having a beveled outer end for the usual engagement with a keeper plate, and means projecting from the inner end thereof for communicating endwise movement to the bolt, said means including a crosspin intersecting the central longitudinal plane of the casing, an operating finger having a slotted end disposed in the central longitudinal plane of the casing and adapted to be detachably engaged on the crosspin, a bracket for pivotally supporting said finger having means for detachably mounting the same on the inner end of said casing, the inner end of said casing having means on diametrically opposite sides thereof for support of said bracket interchangeably on either side of the casing, said casing being adapted to be turned on its longitudinal axis so as to face the beveled surface of the bolt toward either side of the door, the bracket and finger being adapted to be assembled in relation to the casing and bolt in the manner stated through another hole bored in the edge portion of the door in transverse intersecting relation to the inner end of the first mentioned hole, an outside key-operated lock insertible in the last mentioned hole and including a rotatable cylinder and shaft rotatable therewith detachably connectible with the operating finger to operate the bolt with a key, said shaft having a lost motion operating connection with the cylinder to permit turning of the shaft independently of the cylinder through a predetermined angularity, and an inside manually operable knob detachably connectible with said shaft for movement of the bolt in either direction independently of the lock.

7. A device as set forth in claim 6, wherein the operating finger has that portion thereof which is pivoted on the bracket laterally offset in relation to the slotted portion that is connected with the crosspin, the offsetting being in a direction away from the key-operated lock, substantially as and for the purpose described.

8. A device as set forth in claim 6, wherein the operating finger has that portion thereof which is pivoted on the bracket laterally offset in relation to the slotted portion that is connected with the crosspin, the offsetting being in a direction away from the key-operated lock, substantially as and for the purpose described, and wherein the bracket pivotally supporting said finger has its finger supporting end portion laterally offset in relation to the other end portion of the bracket in the same direction, substantially as and for the purpose described.

9. A device as set forth in claim 6, wherein the operating finger has that portion thereof which is pivoted on the bracket laterally offset in relation to the slotted portion that is connected with the crosspin, the offsetting being in a direction away from the key-operated lock, substantially as and for the purpose described, and wherein the bracket pivotally supporting said finger has its finger supporting end portion laterally offset in relation to the other end portion of the bracket in the same direction, substantially as and for the purpose described, the intermediate portion of the bracket connecting the relatively offset end portions providing a bearing surface adapted to engage the bottom of the hole bored in the door to support and locate the bracket and finger with respect to the key-operated lock and manually operated knob.

10. In a bore type door lock, the combination with a bolt casing having a bolt movable endwise therein, said casing being insertible in one of the usual transverse intersecting holes in a door, and a key-operable lock insertible in the other hole so that its inner end is disposed in vertically spaced relation over the inner end of the bolt casing, the key-operable lock including a key-rotatable cylinder, of a support, means for detachably connecting the same to the inner end of said bolt casing, the support having an end portion disposed spaced from the inner end of said cylinder, and a finger pivotally mounted on the latter portion of said support, and having a free end portion bent into offset relation to the pivoted end portion making a detachable operating connection with the bolt.

11. In combination, a key-operable door lock having a key-rotatable cylinder, a bolt casing having a bevel-ended bolt movable endwise therein in transverse relation to the inner end of the cylinder, and means operable by the cylinder and detachably connectible to the bolt casing on either side thereof including a bolt operating finger detachably connectible with the bolt in either position of said means on said bolt casing, whereby said bolt casing is adjustable relative to said lock to face the bevel of the bolt in either direction relative to the door.

12. In a bore type door lock, the combination of a casing insertible in a hole bored into the edge portion of a door from the edge thereof, a bolt movable endwise in the casing having a beveled outer end for the usual engagement with a keeper plate, and means projecting from the inner end thereof for communicating endwise movement to the bolt, said means including a crosspin intersecting the central longitudinal plane of the casing, and a key operable lock insertible in another hole bored in the edge portion of the door in transverse intersecting relation to the inner end of the first hole, so that its inner end is disposed in vertically spaced relation with respect to the crosspin, said casing being adapted to be turned on its longitudinal axis so as to face the beveled surface of the bolt toward either side of the door, the crosspin in either position of rotary adjustment of the bolt with the casing being disposed in approximately the same spaced relationship to the key operable lock, the key operable lock including a key rotatable cylinder, a support, means for detachably connecting the support to the inner end of the bolt casing, the support having an end portion disposed spaced from the inner end of said cylinder, and a finger pivotally mounted on the latter portion of said support, and having a free end portion bent into offset relation to the pivoted end portion making a detachable operating connection with the crosspin on the bolt.

13. In a bore type door lock, the combination with a bolt casing having a bolt movable endwise therein, said casing being insertible in one of the usual transverse intersecting holes in a door, and an inside manually operable knob for rotating a shaft insertible in the other hole, so that its inner end is disposed in vertically spaced relation over the inner end of the bolt casing, of a support, means for detachably connecting the same to the inner end of the bolt casing, and a finger pivotally mounted on said support and having a free end portion making a detachable operating connection with the bolt.

14. In combination, an inside manually operable knob for operating a door lock, a shaft rotatable with the knob, a bolt casing having a bevel-ended bolt movable endwise therein in transverse relation to said shaft, and means operable by said shaft and detachably connectible to the bolt casing on either side thereof including a bolt operating finger detachably connectible with the bolt in either position of said means on said bolt casing, whereby said bolt casing is adjustable relative to said knob to face the bevel of the bolt in either direction relative to the door.

15. In combination, a key-operable door lock having a key-rotatable cylinder, a bolt casing having a bevel-ended bolt movable endwise therein in transverse relation to the inner end of the cylinder, means detachably connectible to the bolt casing on either side thereof including a shaft rotatable by the cylinder and a bolt operating finger turning with the shaft and detachably connectible with the bolt in either position of said means on said bolt casing, whereby said bolt casing is adjustable relative to said lock to face the bevel of the bolt in either direction relative to the door, said shaft having a lost motion operating connection with the cylinder to permit turning of the shaft independently of the cylinder through a predetermined angularity, and an inside manually operable knob detachably connectible with said shaft for movement of the bolt in either direction independently of the lock.

16. In a device of the character described, the combination of a casing insertible in a hole bored into the edge portion of a door from the edge thereof, a bolt movable endwise in said casing having means projecting from the inner end thereof for communicating endwise movement to the bolt, said means including a crosspin, an elongated operating finger having one end adapted to be connected to the crosspin, there being another hole bored in the edge portion of the door at a different elevation but in transverse intersecting relation to the inner end of the first mentioned hole, and an outside key-operated lock insertible in the last mentioned hole to a point beyond a vertical plane through the longitudinal centerline of said bolt and including a rotatable cylinder and a shaft extending therefrom and rotatable therewith, said operating finger being bent intermediate its ends to offset its other end relative to the first end inwardly away from the key-operated lock, said shaft being adapted to be connected to said offset end, whereby to operate the bolt with a key.

17. In a device of the character described, the combination of a casing insertible in a hole bored into the edge portion of a door from the edge thereof, a bolt movable endwise in said casing having means projecting from the inner end thereof for communicating endwise movement to the bolt, said means including a crosspin, an elongated operating finger having one end adapted to be connected to the crosspin, there being another hole bored in the edge portion of the door at a different elevation but in transverse intersecting relation to the inner end of the first mentioned hole, an outside key-operated lock insertible in the last mentioned hole to a point beyond a vertical plane through the longitudinal centerline of said bolt and including a rotatable cylinder and a shaft extending therefrom and rotatable therewith, said operating finger being bent intermediate its ends to offset its other end relative to the first end inwardly away from the key-operated lock, said shaft being adapted to be connected to said offset end, whereby to operate the bolt with a key, said shaft having a lost motion operating connection with the cylinder to permit turning of the shaft independently of the cylinder through a predetermined angularity, and an inside manually operable knob detachably connectible with said shaft for movement of the bolt in either direction independently of the lock.

18. In a device of the character described, the combination of a casing insertible in a hole bored into the edge portion of a door from the edge thereof, a bolt movable endwise in said casing having a beveled outer end for the usual engagement with a keeper plate, and means projecting from the inner end thereof for communicating endwise movement to the bolt, said means including a crosspin intersecting the central longitudinal plane of the casing, an operating finger having one end adapted to be connected to the crosspin, said casing being adapted to be turned on its longitudinal axis so as to face the beveled surface of the bolt toward either side of the door, said operating finger being connectible with said crosspin in either position of rotation of said bolt, there being another hole bored in the edge portion of the door at a different elevation but in transverse intersecting relation to the inner end of the first mentioned hole, and an outside key-operated lock insertible in the last mentioned hole to a point beyond the central longitudinal plane of said casing and including a rotatable cylinder and a shaft extending therefrom and rotatable therewith, said operating finger being bent intermediate its ends to offset its other end relative to the first end inwardly away from the key-operated lock, said shaft being adapted to be connected to said offset end, whereby to operate the bolt with a key.

19. In a device of the character described, the combination of a casing insertible in a hole bored into the edge portion of a door from the edge thereof, a bolt movable endwise in said casing having a beveled outer end for the usual engagement with a keeper plate, and means projecting from the inner end thereof for communicating endwise movement to the bolt, said means including a crosspin intersecting the central longitudinal plane of the casing, an operating finger having one end adapted to be connected to the crosspin, said casing being adapted to be turned on its longitudinal axis so as to face the beveled surface of the bolt toward either side of the door, said operating finger being connectible with said crosspin in either position of rotation of said bolt, there being another hole bored in the edge portion of the door at a different elevation but in transverse intersecting relation to the inner end of the first mentioned hole, an outside key-operated lock insertible in the last mentioned hole to a point beyond the central longitudinal plane of said casing and including a rotatable cylinder and a shaft extending therefrom and rotatable therewith, said operating finger being bent intermediate its ends to offset its other end relative to the first end inwardly away from the key-operated lock, said shaft being adapted to be connected to said offset end, whereby to operate the bolt with a key, said shaft having a lost motion operating connection with the cylinder to permit turning of the shaft independently of the cylinder through a predetermined angularity, and an inside manually operable knob detachably connectable with said shaft for movement of the bolt in either direction independently of the lock.

20. In a bore type door lock, the combination with a bolt casing having a bolt movable endwise therein, said casing being insertible in one of the usual transverse intersecting holes in a door, and a key-operable lock insertible in the other hole so that its inner end is disposed in vertically spaced relation to the inner end of the bolt casing and is also laterally offset relative thereto, the key-operable lock including a key-rotatable cylinder and a shaft rotatable therewith, of a finger detachably connectible at one end with said shaft and having a free end portion bent into offset relation to the first named end portion making a detachable operating connection with the bolt.

21. In combination, a key-operable door lock having a key-rotatable cylinder, a bolt casing having a bevel-ended bolt movable endwise therein in transverse relation to the inner end of the cylinder, said bolt being rotatably adjustable on its longitudinal axis to face its beveled outer end toward either side of the door without changing the operative relationship of its inner end to said cylinder, and means including a bolt operating finger operable by the cylinder and detachably connectable to the inner end of said bolt in either position of rotation thereof.

22. In a bore type door lock, the combination of a casing insertible in a hole bored into the edge portion of a door from the edge thereof, a bolt movable endwise in the casing having a beveled outer end for the usual engagement with a keeper plate, and means projecting from the inner end thereof for communicating endwise movement to the bolt, said means including a crosspin intersecting the central longitudinal plane of the casing, and a key operable lock insertible in another hole bored in the edge portion of the door in transverse intersecting relation to the inner end of the first hole, so that its inner end is disposed in vertically spaced relation to the crosspin and is also laterally offset relative thereto, said casing being adapted to be turned on its longitudinal axis so as to face the beveled surface of the bolt toward either side of the door, the crosspin in either position of rotary adjustment of the bolt with the casing being disposed in approximately the same spaced relationship to the inner end of the key operable lock, the key operable lock including a key rotatable cylinder and a shaft arranged to be turned with it, and a finger connectible to said shaft adjacent the inner end of said cylinder and having a free end portion bent into offset relation to the other end portion making a detachable operating connection with the crosspin on the bolt.

23. In a bore type door lock, the combination with a bolt casing having a bolt movable endwise therein, said casing being insertible in one of the usual transverse intersecting holes in a door, of a lock operable with a key from outside the door, together with an inside manually operable knob insertible in end to end relation in the other hole, so that the inner end of the lock is disposed in vertically spaced relation over the inner end of the bolt casing, said lock comprising a body and a key-operable cylinder rotatable in said body, a shaft rotatable by said knob and having a lost motion operating connection with the cylinder, and a finger detachably connectible at one end to said shaft behind said cylinder and having a laterally offset free end portion making a detachable operating connection with the bolt beneath said cylinder.

24. In combination, an inside manually operable knob for operating a door lock, a shaft rotatable with the knob, a bolt casing having a bevel-ended bolt movable endwise therein in transverse relation to said shaft, said bolt being rotatably adjustable on its longitudinal axis to face its beveled outer end toward either side of the door without changing the operative relationship of its inner end to said shaft, and means operable by said shaft including a bolt operating finger detachably connectible to the inner end of the bolt in either position of rotation of said bolt.

25. In combination, a key-operable door lock having a key-rotatable cylinder and a shaft rotatable therewith, a bolt casing having a bevel-ended bolt movable endwise therein in transverse relation to the inner end of the cylinder, said bolt being rotatably adjustable on its longitudinal axis to face its beveled outer end toward either side of the door without changing the operative relationship of its inner end to said cylinder, means comprising a finger detachably connectible with said bolt in either of its two positions of rotary adjustment for operating said bolt, said shaft having a lost motion operating connection with the cylinder to permit turning of the shaft independently of the cylinder through a predetermined angularity, and an inside manually operable knob detachably connectable with said shaft for movement of the bolt in either direction independently of the lock.

MATTHEW SPINELLO.